Figure 1:
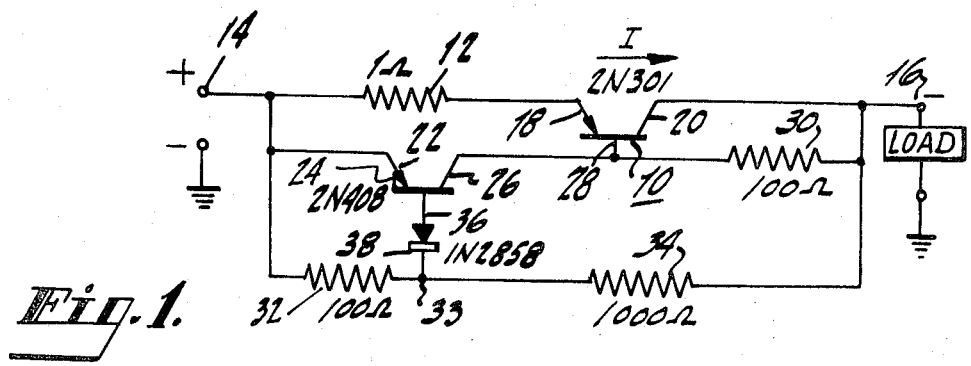

United States Patent

[11] 3,624,490

[72] Inventor Michael Scott Fisher
Ringoes, N.J.
[21] Appl. No. 342,649
[22] Filed Feb. 5, 1964
[45] Patented Nov. 30, 1971
[73] Assignee RCA Corporation

[54] TWO TERMINAL CURRENT REGULATOR
22 Claims, 3 Drawing Figs.

[52] U.S. Cl. .................................................... 323/9,
323/39
[51] Int. Cl. ................................................... G05f 1/58
[50] Field of Search........................................... 307/88.5
(15.2); 323/22 T, 9, 39; 321/11, 14

[56] References Cited
UNITED STATES PATENTS

| | | | |
|---|---|---|---|
| 2,978,630 | 4/1961 | La Tour...................... | 323/4 |
| 3,028,473 | 4/1962 | Dyer........................... | 219/20 |
| 3,182,246 | 5/1965 | Lloyd.......................... | 323/22 |
| 3,251,951 | 5/1966 | Meewezen................... | 179/81 |
| 3,255,402 | 6/1966 | Vollnhals .................... | 323/22 |

Primary Examiner—A. D. Pellinen
Attorney—Eugene M. Whitacre

ABSTRACT: A two terminal current-limiting circuit is in series with the power supply of a circuit to be protected. An increase in load current is accompanied by an increase in voltage across the terminals. A portion of this voltage is applied to a controlling transistor which renders a series transistor less conductive.

INVENTOR.
MICHAEL S. FISHER
BY Eugene M. Whitacre
Attorney 3,624,490

TWO TERMINAL CURRENT REGULATOR

In many electrical circuit applications it is desirable to provide some form of current regulation to prevent excessive current flow from a power supply to a load. Such control of current is of particular importance in high-power transistor amplifier circuits, wherein a fault condition, such as a shorted load, may cause the destruction of expensive power output transistors. In many cases, such destruction can take place in a matter of microseconds.

Previous protection devices, such as fuses or mechanical-type circuit breakers cannot respond fast enough to provide the desired protection. Furthermore, most types of electrical current limiting circuits limit the load current at some maximum value. Under many conditions the voltage applied across the output transistors at sustained values of high current (maximum limited value) causes power dissipation which destroys the transistor after a period of time. Such current-limiting circuits require regulating devices that have power ratings far exceeding the power to be delivered to the load in order to successfully limit the current at some maximum value. As a result, a circuit designed to limit the current at a maximum value may become prohibitively expensive.

It is therefore an object of this invention to provide a new and improved semiconductor two-terminal overload protection circuit.

It is a further object of this invention to provide a semiconductor overload protection circuit with sufficient speed of response to sudden changes in current demand to protect semiconductor devices against both transient as well as continuous short circuits.

It is also an object of this invention to provide a new and improved semiconductor overload protection circuit employing a current-limiting capable of protecting semiconductor circuits without dissipating a large amount of power or having a power rating exceeding the power that must be delivered to the load.

The current limiting circuit of the present invention is a two-terminal circuit that may be put in series with the power supply of the circuit to be protected. The invention includes a pair of transistors, one providing a series current path between the two terminals and the other controlling the series transistor. A portion of the voltage developed across the two terminals is applied to the controlling transistor. The controlling transistor responds to an increase in voltage across the terminals due to an increase in load current to render the series transistor less conductive.

The novel features which are considered to be characteristic of this invention are set forth in particularity in the appended claims.

Figure 2:
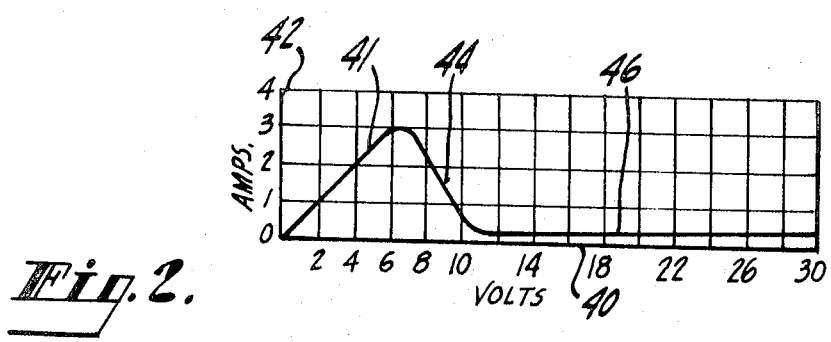
Figure 3:
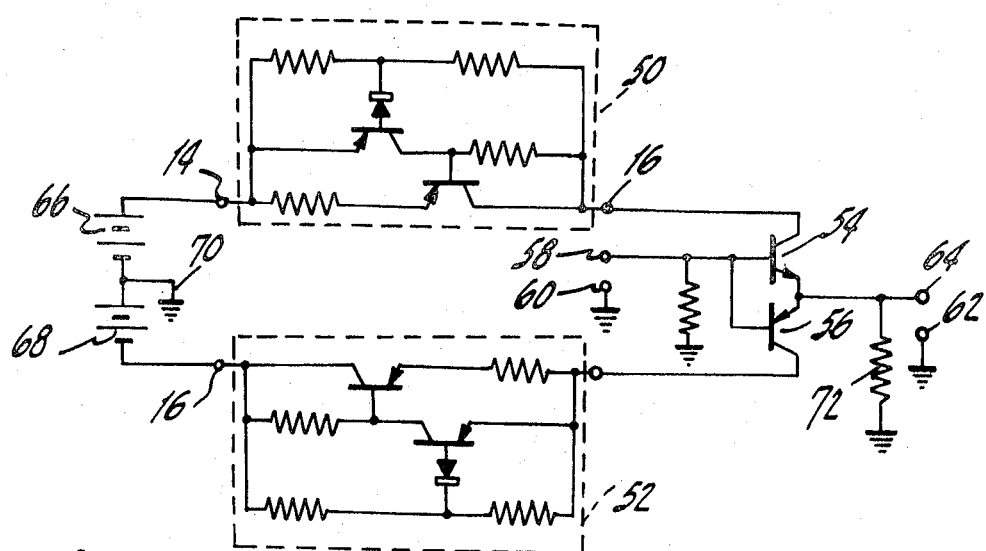

The invention itself, however, both as to its organization and method of operation will best be understood from the following description when read in connection with the accompanying drawings in which:

FIG. 1. a schematic circuit diagram of a semiconductor overload protection circuit embodying the invention;

FIG. 2 is a graph showing the current-voltage response of the circuit shown in FIG. 1; and FIG. 3 is a schematic circuit diagram illustrating the use of a pair of the protection circuits of FIG. 1 to protect a two-power supply single-ended push-pull circuit against an overload.

Referring now to the drawings wherein like reference numerals are used to designate like component in the various FIGS. thereof, and particularly to FIG. 1, the overload protection circuit is shown containing a power transistor 10 connected in a series circuit between a terminal 14 and a terminal 16. An emitter resistor 12 is connected between the emitter 18 of the transistor 10 and the terminal 14. The series circuit is completed by connecting the collector 20 of the transistor 10 to the terminal 16.

An emitter 22 of a controlling transistor 24 is also connected to the terminal 14 and a collector 26 of the controlling transistor 24 is connected to a base 28 of the power transistor 10 and to one lead of a biasing resistor 30. The collector circuit of the transistor 24 is completed by the connection of the other lead of the resistor 30 to the terminal 16.

Connected across the terminals 14 and 16 is a pair of biasing resistors 32 and 34 which form a voltage divider having a junction 33. A base 36 of the controlling transistor 24 is coupled to the junction 33 by a diode 38. The anode of the diode 38 is connected to the base 36, and the cathode of the diode 38 is connected to the junction 33 forming a unidirectional current path from the base 36 to the junction 33.

Although the present example in FIG. 1 illustrates the use of PNP-type transistors, the circuit operates substantially as well modified for the use of NPN transistors. Such a modification requires the reversal of the connections of the diode 38, and a substitution of the NPN transistor for the PNP element for element. The operation of the modified circuit is substantially the same if the polarity of the voltage applied to the terminals 14 and 16 is reversed.

The curve in FIG. 2 is a graphic representation of the operation of the circuit in FIG. 1 as a function of the current flowing between the terminals 14 and 16. The abscissa 40 represents the voltage drop across the terminals 14 and 16 while the ordinate 42 represents the current flow between the terminals 16 and 14.

The circuit of FIG. 1 can be incorporated into any circuit requiring protection by connecting the two-terminal device in series with the direct voltage power supply line to the circuit with the correct polarity to provide for current flow from terminal 14 to terminal 16 as illustrated in FIG. 1. When connected in this manner, the overload circuit fulfills the dual function of protecting the power supply against an overload as well as protecting the connected load.

The circuit operation will be explained with reference to FIG. 1, but the explanation applies as well to a modified circuit with NPN-transistors. The transistor 10 in FIG. 1 is biased into a saturation through the resistor 30 during the normal current drain by the attached load. The load may be connected between terminal 16 and ground as shown, with the power supply between terminal 14 and ground. The load and power supply may be interchanged if desired, and if the proper polarities of connection are observed. For the designated component values shown in FIG. 1 the circuit is designed for normal current drain of between 0 and 3 amps as shown by slope 41, the curve in FIG. 2. The transistor 24 during this period of operation is biased to a cutoff condition by the biasing resistors 32 and 34 and the diode 38. With the transistor 10 is saturation, and the transistor 24 cutoff, these transistors are operating under the minimum power dissipation conditions during normal current demand.

When a predetermined maximum amount of current is drawn by the attached load, (which in the present example is 3 amps as shown in FIG. 2), the voltage drop across terminals 14 and 16 due to the current flow through the resistor 12 and the saturated transistor 10, reaches a level at which the voltage developed at the junction 33 is sufficient to drive the series combination of the diode 38 and the emitter 22-base 36 junction of transistor 24 into conduction. This increased biasing voltage causes the transistor 24 to conduct thereby increasing the voltage drop across the resistor 30. The increases voltage drop across the resistor 30 is of a polarity to reduce the conductance of the transistor 10. As the transistor 10 comes out of saturation, the voltage across the terminal 16 and 14 increases, thereby again further increasing the voltage on the base 36 of the transistor 24. A regenerative-type effect takes place until the transistor 10 is substantially completely cut off and the transistor 24 is saturated full on. The transitional state between saturation and cutoff of transistor 10 is shown by the slope of region 44 of FIG. 2. Once the circuit current conduction has reached the 3 ampere level the controlling transistor 24 takes control and effectively instantaneously switches the circuit through the region 44 into a region of reduced current or protecting condition 46. This negative slope region 44 accounts for the sensitivity of the overload protection device and enables the device to switch into the current limiting condition 46 within at least 15 microseconds of an applied overload. This is sufficient response to protect against semiconductor overload conditions.

While the circuit is in the protecting condition 46, only the transistor 24 is conducting (fully saturated) while the transistor 10 is completely cut off. While the circuit is in the protecting condition 46, the transistors again are operating under minimum power dissipation. In the protecting condition 46, substantially the only current supplied to the load is that which flows through the resistor 30. In the present example the resistor 30 has a value of 100 ohms, which for all practical purposes is high enough to limit the current to a point that can be considered an open circuit. Once the circuit has reached the overload protecting condition 46 the circuit remains in this condition until the current flow to current limiting circuit is cut off. The circuit is not self-resetting and therefore remains in the protecting condition 46 indicating a fault occurred even though the fault is subsequently corrected. The current-limiting circuit is resettable for normal operation by completely cutting-off the current to the circuit.

The diode 38, shown connected to the biasing circuit of transistor 24 in FIG. 1, is incorporated into the circuit to provide a delay in reaching the switching condition and to provide fast switching once the preset current limit is reached. In the present example, the transistor 24 (2N408) is a germanium-type transistor while the diode 38 (1N2858) is a silicon device. The 0.6–0.7 volts forward conduction voltage of the diode 38 provides the delay for the switching time. Furthermore, forward conduction curve of the silicon diode 38 is much sharper than the forward conduction curve ($V_{BE}$) between the emitter 22 and the base 36 of the transistor 24 thereby providing the sharp response in slope 44 and hence fast switching, once the diode conduction begins. The diode 38 may be eliminated and the base 36 of the transistor 24 may be directly connected to the junction 33. The value of the resistors 32 and 34 can be adjusted to compensate for the removal of the diode 38 and the circuit in FIG. 1 then operates as an overload protecting device but with a slower response, and more gradual slope in the negative resistance slope or region 44.

The resistor 12 in FIG. 1 can also be eliminated and the circuit continues to operate as an overload protection device. Under these conditions, the transistor 10 is not completely turned off unless it is a silicon-type transistor. Again the values of the resistors 32 and 34 require adjusting to compensate for the elimination of the resistor 12. The resistor 12, in addition to providing a voltage drop proportional to current between the terminals 14 and 16, provides an added advantage of allowing the interchangability of the transistor 10 by compensating for the difference in the gain between various transistors of the same type.

FIG. 3 illustrates the versatility of the overload protection circuit of FIG. 1 by demonstrating how a pair of these devices can be incorporated into a circuit requiring power supplies of both polarities.

The transistors 54 and 56 of FIG. 3 are complementary NPN, PNP-transistors connected for signal ended push-pull operation. The input signals are applied across the terminals 58 and 60 and the output is taken across the terminals 62 and 64. A circuit of this type requires power supplies of both polarities 66 and 68 each referenced to ground 70. Complete overload protection for this type of circuit can only be afforded by preventing excessive current flow from either power supply. This type of current overload can be illustrated by a short across a load 72 to ground 70. An overload protection device in series with one power supply may protect the circuit against excessive current flowing through both power supplies or from the connected power supply to ground but does not protect against the excessive current flowing from the unprotected power supply to ground.

As shown in FIG. 3, an overload protection circuit in the dashed block 50 protects against excessive current from the positive power supply 66 while the circuit in the dashed block 52 protects against excessive current from the negative power supply 68. In each case the same overload protection circuit is used in both blocks 50 and 52 by connecting the circuit for correct current flow between the terminals 14 and 16.

The overload protection circuit is self-resetting when in use with a class B or class C biased-type circuit. In FIG. 3 with zero signal input across terminals 58 and 60, the transistors 54 and 56 are cut off. The transistors 56 and 54 are switched off and on depending upon the polarity of the input signal. With an alternating input current signal the transistors 54 and 56 are cut off in alternate half cycles. Any overload introduced into the circuit causing excessive current to ground is reflected automatically through the affected power supply causing the associated overload protection device to trip to the protecting condition 46. Since the transistors are cut off at alternate half cycles, the current through the associated overload protection circuit will also be cut off at each half cycle automatically resetting the overload protection circuit for normal operation.

If only a transient current overload had occurred the overload protection circuit is automatically reset for normal operation as the transistors are switched. If the short circuit persists, the overload circuit again switches into its protecting condition 46. The cycle keeps repeating until the fault has been removed.

From the foregoing description it can be seen that overload protection for semiconductor circuits can be incorporated into any circuit by the use of the overload protection circuit of FIG. 1. The two-terminal device may be inserted in series with the power supply line of the circuit to be protected. The circuit is designed with regenerative feedback that is a function of current drawn through it. This regenerative feedback allows the circuit to switch from a normal operating condition to an overload condition with sufficient speed of response to protect the associated semiconductor circuits against transient overload, Furthermore, the protection circuit transistors while either in the normal or the overload conditions are in a saturated or a cut off condition, continuously dissipating a minimum amount of power thereby being capable of protecting against continuous overloads as well as transients.

What is claimed is:

1. A two-terminal network comprising:
    first and second terminals;
    first and second semiconductor devices each having base, collector and emitter electrodes;
    means connecting said first device emitter electrode to said first terminal;
    means connecting said first device collector electrode to said second terminal;
    biasing means connecting said first device base electrode to said second terminal;
    means connecting said second device emitter electrode to said first terminal;
    means connecting said second device collector electrode to said first semiconductor base electrode; and
    means coupling a portion of a variable direct voltage developed across said first and second terminals to said second device base electrode whereby increased conduction of said second device in response to an increased voltage across said first and second terminals renders said first device less conductive.

2. A two-terminal network comprising:
    first and second terminals;
    first and second semiconductor devices each having a base, a collector and emitter;
    a resistor connected between said first device emitter and said fist terminal;
    said first device collector being connected to said second terminal;
    biasing means connecting said first device base to said second terminal;
    said second device emitter being connected to the first terminal;

means connecting said second device collector to said first device base; and means coupling a portion of a variable direct voltage developed across said first and second terminals to said second device base whereby increased conduction of said second device in response to an increased voltage across said first and second terminals renders said first device less conductive.

3. A two-terminal network comprising:

first and second terminals;

first and second semiconductor devices each having base, collector and emitter electrodes;

means connecting said first device emitter electrode to said first terminal;

means connecting said first device collector electrode to said second terminal;

biasing means connecting said first device base electrode to said second terminal;

means connecting said second device emitter electrode to said first terminal;

means connecting said second device collector electrode to said first device base electrode;

a voltage divider coupled to said first and second terminals and across which a variable direct voltage is developed; and means coupling said voltage divider to said second device base whereby increased conduction of said second device in response to an increased voltage across said first and second terminals renders said first device less conductive.

4. A two-terminal network comprising:

first and second terminals;

first and second semiconductor devices each having a base, a collector and an emitter;

said first device emitter being connected to said first terminal;

said first device collector being connected to said second terminal;

biasing means connecting said first device base to said second terminal;

said second device emitter being connected to said first terminal;

means coupling said second device collector to said first device base;

a voltage divider coupled to said first and second terminals and across which a variable direct voltage is developed; and mean coupling a diode to said voltage divider and said second device base increased whereby conduction of said second device in response to an increased voltage across said first and second terminals renders said first device less conductive.

5. A two-terminal network comprising:

first and second terminals;

first and second semiconductor devices each having a base, a collector and an emitter;

an impedance element coupled between said first device emitter and said first terminal;

said first device collector being coupled to said second terminal;

biasing means coupling said base of said first device to said second terminal;

said second device emitter being coupled to said first terminal;

coupling means coupling said second device collector to said first device base;

a voltage divider coupled to said first and second terminals and across which a variable direct voltage is developed; and means coupling said voltage divider to said second device base whereby increased conduction of said second device in response to an increased voltage across said first and second terminals renders said first device less conductive.

6. A two-terminal network comprising:

first and second terminals across which a variable direct voltage is developed;

first and second semiconductor devices each having a base, collector and emitter;

means connecting said first device emitter to said first terminal;

means connecting said first device collector to said second terminal;

biasing means coupled to said first device base for biasing said first device into saturation;

means coupling said second device emitter to said first terminal;

means coupling said second device collector to said first device base; and means coupling a portion of the voltage developed across said first and second terminals to said second device base so that as said voltage developed across said first and second terminals increases beyond a predetermined level said second device is rendered conductive and renders said first device nonconductive.

7. A two-terminal network comprising:

first and second terminals across which a variable direct voltage is developed;

first and second semiconductor device each having a base, collector and emitter;

means connecting said first device emitter to said first terminal;

means connecting said first device collector to said second terminal;

biasing means coupled to said first device base for biasing said first device into saturation;

means connecting said second device emitter to said first terminal;

means connecting said second device collector to said first device biasing means;

means biasing said second device to cutoff, said second device biasing means coupling a portion of the voltage developed across said first and second terminals to said second device base, so that as said voltage developed across said first and second terminals reaches a predetermined level said second device switches into a saturated condition cutting off said first device.

8. A two-terminal network comprising:

first and second terminals across which a variable direct voltage is developed first and second semiconductor devices each having a base, collector and emitter;

means coupling said first device emitter to said first terminal;

means coupling said first device collector to said second terminal;

biasing means coupled to said first device base for biasing said first device into saturation;

means coupling said second device emitter to said first terminal;

means coupling the second device collector to said first device base;

biasing means biasing said second device to cutoff, said second device biasing means coupling a portion of the voltage developed across said first and second terminal to said second device base, so that when said voltage developed across said first and second terminals reaches a predetermined level said second device switches into a saturated condition cutting off said first device, whereby said second device remains in a saturated condition and said first device remains cutoff until the current to the two-terminal network is cut off.

9. A current limiting device comprising:

first and second terminals across which a variable direct voltage is developed;

first and second transistors each having a base, collector and emitter;

a first resistor connected between said first terminal and said first transistor emitter;

said first transistor collector being connected to said second terminal;

said second transistor emitter being connected to said first terminal;

said second transistor collector being connected to said first transistor base;

a second resistor connected between said first transistor base and said second terminal;

third and fourth resistors connected together forming a junction, said third and fourth resistors being connected between said first and second terminals; and a diode coupled between the junction of said third and fourth resistors and said second transistor base.

10. A current-limiting device comprising:

first and second terminals across which a variable direct voltage is developed;

first and second transistors each having a base, collector and emitter;

first resistor one lead of which is coupled to said first terminal and the other lead of which is coupled to said emitter of said first transistor;

said collector of said first transistor being coupled to said second terminal;

said emitter of said second transistor being connected to said first terminal;

said collector of said second transistor being coupled to said first transistor base;

a second resistor one lead of which is coupled to said first transistor base and the other lead of which is coupled to said second terminal;

a voltage divider coupled across said first and second terminals; and means coupling said voltage divider to said second transistor base.

11. An electric circuit for use with a two-terminal direct current source and a two-terminal load, where a first load terminal is connected to a first source terminal and where said circuit is connected between the second load terminal and the second source terminal, across which a variable direct voltage is developed, a transistor having emitter, base and collector electrodes;

a resistor connected between one of said second load terminal and said second source terminal and said transistor emitter electrode;

said collector electrode being connected to the other of said second load terminal and said second source terminal;

means coupled to said base electrode for biasing said transistor into saturation; and means operable to couple a portion of the voltage developed between said second load and source terminals at a predetermined current to said transistor base electrode to cutoff said transistor.

12. An electric circuit for use with a two-terminal direct current source and a two-terminal load where a first load terminal is connected to a first source terminal and where said circuit is connected between the second source terminal and the second load terminal across which a variable direct voltage is developed said electric circuit comprising:

a first transistor having emitter, base and collector electrodes;

said emitter and collector electrodes being respectively connected to said second source terminal and said second load terminal;

biasing means coupled to said base electrode for biasing said first transistor into saturation;

a second transistor having emitter, base, and collector electrodes;

said second transistor emitter electrode being connected to said first transistor emitter electrode;

said second transistor collector electrode being connected to said biasing means;

biasing means coupled to said second transistor base electrode for biasing said second transistor to cutoff;

said second transistor biasing means coupling a portion of the voltage developed across said second source terminal and second load terminal to said second transistor base electrode whereby at a predetermined level said voltage switches said second transistor into saturation and said first transistor into cutoff, said circuit remaining in this condition until the current flow between said current source and said load is cutoff.

13. A two-terminal current regulator comprising:

a pair of terminals;

a first semiconductor device having emitter, base and collector electrodes;

means connecting the emitter-to-collector current path of said first device between said pair of terminals;

a second semiconductor device having emitter, base and collector electrodes;

means including an impedance element connecting the emitter-to-collector current path of said second device between said pair of terminals in a manner that one terminal of said impedance is connected to the collector electrode of said first transistor;

means connecting the other terminal of said impedance element to the base electrode of said first transistor;

means providing a voltage divider connected between said pair of terminals and across which a variable direct voltage is developed; and means connecting the base electrode of said second transistor to said voltage divider to maintain said second transistor cutoff until the current between said pair of terminals through the emitter-to-collector current path of said first transistor reaches a predetermined magnitude.

14. A two-terminal current regulator comprising:

a pair of terminals across which a variable direct voltage is developed;

a transistor having emitter, base and collector electrodes;

means connecting the emitter-to-collector current path of the transistor between said pair of terminals;

biasing means coupled to the base electrode of said transistor for biasing said transistor in saturation; and means operable to couple a portion of the voltage developed between said pair of terminals due to a predetermined current flow between said pair of terminals to said transistor base to render said transistor nonconductive.

15. A two-terminal current regulator comprising:

first and second terminals, first and second transistors, each having emitter, base and collector electrodes; means connecting said first transistor emitter electrode to said first terminal;

a first resistor connecting said first transistor base electrode to said second terminal;

a direct connection from said first transistor collector electrode to said second terminal;

second and third resistors serially connected across said first and second terminals;

a direct connection from said second transistor emitter electrode to said first terminal;

means connecting said second transistor base electrode to the junction of said second and third resistors;

and a direct connection from said second transistor collector electrode to said first transistor base electrode.

16. A two-terminal current regulator as defined in claim 15 wherein said first transistor emitter electrode connecting means includes a fourth resistor.

17. A two-terminal current regulator as defined in claim 15 wherein said second transistor base electrode connecting means includes a diode.

18. A two-terminal circuit that exhibits a negative current-voltage characteristic region between first and second positive current-voltage characteristic regions, comprising first and second terminals forming an input and output respectively, first, second and third branches connected in parallel between said first and second terminals, said first branch comprising a first transistor having its emitter connected to said first terminal, and means connecting the collector of said first transistor to said second terminal, said second branch comprising a second transistor having it emitter connected to said first terminal, and resistor means connected between the collector of said second transistor and said second terminal, said first and second transistors being of the same conductivity type, said third branch comprising a resistive voltage divider having a tap, means connecting the base of said first transistor to the collector of said second transistor, means connecting the base of said second transistor to said tap whereby said divider provides the sole direct current for said second transistor, a source of voltage, and means applying said voltage between said first and second terminals, whereby the voltage between said first and second terminals is variable, the resistances of said voltage divider being proportioned to hold said second transistor in a cutoff state in a first range of voltage between said first and second terminals whereby only said first transistor is conductive, and to bias said second transistor to a conductive state for voltages in a second range between said terminals above said first range, whereby the collector current flow of said second transistor through said resistor means decreases the base current of said second transistor, and in a portion of said second range increasing voltages between said terminals produce a decrease in the collector current of said first transistor that is greater than the increase in collector current of said second transistor.

19. A circuit that exhibits a negative resistance characteristic between first ans second terminals forming an input and output respectively, comprising first ans second transistors of the same conductivity type, means connecting the emitters of said transistors to said first terminal, means connecting the collector of said first transistor directly to said second terminal, means connecting the collector of said second transistor directly to the base of said first transistor, a resistive voltage divider connected between said first and second terminals, said voltage divider having a tap connected to the base of said second transistor, and resistor means connected between the collector and emitter of said first transistor, the resistors of said divider being proportioned to hold said second transistor cutoff for a first range of voltages between the emitter and collector os said first transistor at which said first transistor is conductive, and to bias said second transistor to a conductive state at a second range of voltages between the emitter and collector of said first transistor above said first range, whereby second transistor collector current increases resulting from increases in emitter-collector voltage of said first transistor are less than first transistor collector current decreases in a portion of said second range.

20. A two-port circuit that exhibits a negative resistance characteristic, comprising a source of potential, a first transistor, means connecting said source between the emitter and collector of said first transistor, a second transistor of the same conductivity type as said first transistor having its collector connected directly to the base of said first transistor, means connecting the emitter of said second transistor to the emitter of said first transistor, a resistive voltage divider connected between the emitter and collector of said first transistor, said divider having a tap connected to the base of said second transistor for providing the sole direct current bias for said second transistor, and resistor means connected between the collector and base of said second transistor, said divider being proportioned to hold said second transistor cut off for a first range of emitter-collector voltages of said first transistor during which said first transistor is conductive, and to bias said second transistor to a conductive state for a second range of emitter-collector voltages, of said first transistor above said first range, whereby a negative resistance characteristic occurs between the emitter and collector of said first transistor during a portion of said second range of emitter-collector voltages of said first transistor.

21. A circuit that exhibits a negative resistance characteristic comprising first and second terminals forming an input and output respectively, a source of potential, means applying said potential between said first and second terminals, first and second transistors of the same conductivity type, means connecting the emitter of said first transistor to said first terminal, means connecting the emitter of said second transistor to said first terminal, resistor means having one end connected to the collector of said first transistor, means connecting the other end of said resistor means to the base of said first transistor and the collector of said second transistor, whereby the only current flow through said resistor means is the base current of said first transistor and collector current of said second transistor, means connecting the collector of said first transistor to said second terminal, and a resistive voltage divider connected between said first terminal and the collector of said first transistor, said divider having a tap providing the sole direct bias for said second transistor, said divider being proportioned to hold said second transistor cut off for a first range of emitter-collector voltages of said first transistor during which said first transistor is conductive, and to bias said second transistor to a conductive state for a second range of emitter-collector voltages of said first transistor above said first range, whereby a negative resistance characteristic occurs between the emitter and collector of said first transistor during a portion of said second range of emitter-collector voltages of said first transistor.

22. A bistable circuit comprising a negative resistance circuit having first and second terminals, and a source of voltage and an output impedance serially connected between said first and second terminals, said negative resistance circuit comprising a first transistor, means connecting the emitter of said first transistor to said first terminal, means connecting the collector of said first transistor to said second terminal, a second transistor of the same conductivity type as said first transistor, means connecting the emitter of said second transistor to said first terminal, resistance means connected between the base and collector of said first transistor, means connecting the collector of said second transistor to the base of said first transistor, a resistive voltage divider connected between said first terminal and the collector of said first transistor, and a tap on said divider connected to the base of said second transistor.

* * * * *

UNITED STATES PATENT OFFICE
CERTIFICATE OF CORRECTION

Patent No. 3,624,490            Dated November 30, 1971

Inventor(s) Michael Scott Fisher

It is certified that error appears in the above-identified patent and that said Letters Patent are hereby corrected as shown below:

Column 1, line 56, between "FIG. 1" and "a" insert -- is --.
Column 7, line 41, after "developed" insert -- , said electric circuit comprising: --.

Signed and sealed this 18th day of July 1972.

(SEAL)
Attest:

EDWARD M. FLETCHER, JR.          ROBERT GOTTSCHALK
Attesting Officer                 Commissioner of Patents